United States Patent [19]

Margolis et al.

[11] Patent Number: 4,844,428
[45] Date of Patent: Jul. 4, 1989

[54] AIR SPRING ASSEMBLY

[75] Inventors: Donald L. Margolis; Yoshiyuki Yasui, both of Davis, Calif.

[73] Assignee: Aisin Seiki Kabushiki Kaisha, Japan

[21] Appl. No.: 32,254

[22] Filed: Mar. 31, 1987

[51] Int. Cl.⁴ .......................... F16F 9/04; F16F 9/06; F16F 5/00; F01B 31/14
[52] U.S. Cl. .............................. 267/64.21; 267/64.24; 267/218; 188/318; 92/60.5
[58] Field of Search ............... 267/64.27, 64.24, 64.21, 267/122, 218; 188/315, 318; 92/60.5

[56] References Cited

U.S. PATENT DOCUMENTS

| 3,159,330 | 12/1964 | Boldt | 92/60.5 X |
| 4,445,673 | 5/1984 | Clark | 267/64.24 |
| 4,588,171 | 5/1986 | Stephens | |
| 4,592,450 | 6/1986 | Yokoya et al. | |
| 4,666,135 | 5/1987 | Buna et al. | 267/64.21 |

FOREIGN PATENT DOCUMENTS 0241538 11/1985 Japan ................................ 267/64.21
1029290 5/1966 United Kingdom .

OTHER PUBLICATIONS

Shop Manual published in Japan in Jan., 1986 for the Toyota "Soarer", Automobile—pp. 4-54 and 4-55 of the Manual translated.

Primary Examiner—Andres Kashnikow
Assistant Examiner—Richard Potosnak
Attorney, Agent, or Firm—Banner, Birch, McKie and Beckett

[57] ABSTRACT

An air spring assembly which includes a main air chamber and an interconnected auxiliary air chamber in which there is disposed a piston movable endwise thereof upon actuation of a reversible electric motor to increase or to decrease the volume of the auxiliary air chamber that is open to the main air chamber, thereby adjusting the effective volume of the main air chamber and thus its spring constant.

7 Claims, 1 Drawing Sheet

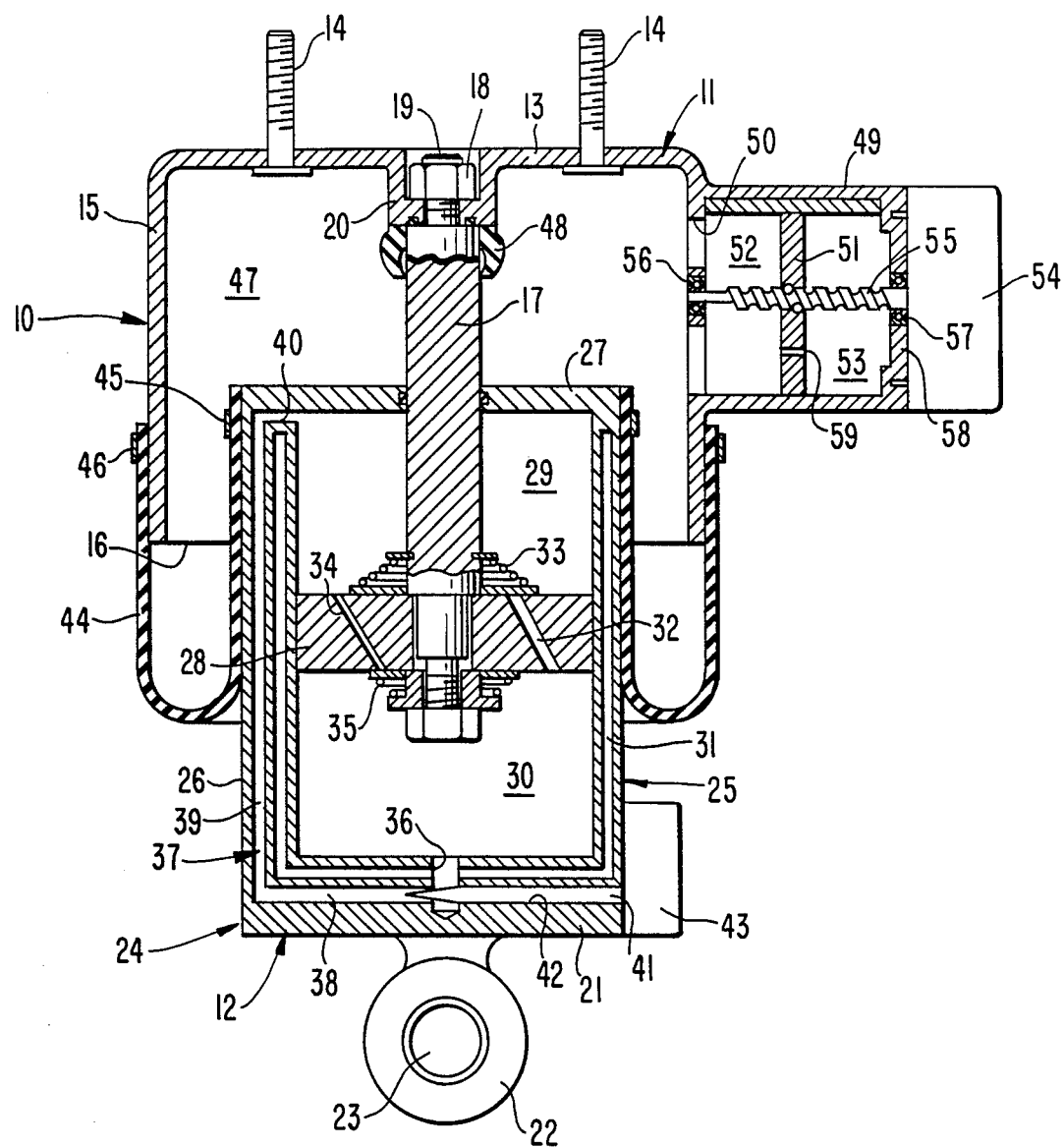

AIR SPRING ASSEMBLY

FIELD OF THE INVENTION

This invention relates to an air spring assembly and more particularly to an air spring assembly for motor vehicles wherein the air spring assembly functions to absorb shock to the vehicle body that occurs, for example, when the running gear encounters a sudden unevenness in the road surface during driving.

DESCRIPTION OF THE PRIOR ART

An air spring assembly for a motor vehicle in which there is a shock absorber that is adjustable to increase or decrease the damping affect and thus make it more or less stiff is known, for example from U.S. Pat. No. 4,588,171. In the device disclosed in this patent the stiffness of the shock absorber is controlled by a needle valve that controls the opening in the fluid path from one side of the damper piston in the shock absorber to the other, the needle valve in turn being adjustable by the operator through a cable. While devices of this nature affect the stiffness of the shock absorber, they do not control the response or the spring constant of the air spring itself.

As shown, for example, in the shop manual that was published in Japan in January 1986 for the TOYOTA "SOARER" automobile, the prior art also includes an air spring having an auxiliary chamber communicating with the main chamber of the air spring to vary the size of the air chamber and thus to vary the spring constant characteristics of the unit. In that case, however, the air passage between the main chamber and the auxiliary chamber is controlled by a rotary valve that, depending on its setting, (1) will close the passage so that the volume of the air spring will be limited to the volume of the main chamber, which is the minimum volume of the air chamber and is thus the stiffest spring condition or (2) will open the passage completely so that the volume of the auxiliary chamber is effectively added to the volume of the main chamber, which is the maximum volume for the air chamber and is the softest spring condition or (3) will position the valve in an intermediate position that provides limited or restricted passage of air between the two chambers and thus represents an intermediate adjustment for the stiffness/softness of the air spring. Devices of this nature are limited to three specific settings of the air spring, which does not provide an optimum cushioning action for all circumstances.

SUMMARY OF THE INVENTION

The object of this invention is to provide an air spring assembly for a vehicle in which the spring constant is infinitely variable over a desired range to provide a stiffer or softer ride and can be readily adjusted at any time to obtain an optimum spring constant with respect to the condition of the road, the load and the speed of the vehicle.

In accordance with the above object, there is provided an air spring assembly with an auxiliary air chamber open to the main chamber and having a piston for varying the volume of auxiliary air chamber in an infinite number of steps from a maximum in which the entire volume of the auxiliary air chamber is open to and thus added to the main air chamber and a minimum in which the auxiliary air chamber is substantially closed off from the main air chamber. Pursuant to this invention, the piston is adapted to be actuated by a reversible electric motor coupled to the piston as by a screw connection whereby, when the motor is actuated, the piston is moved endwise or axially of the auxiliary air chamber. At the same time, there is provided a shock absorber within the air spring in which the resistance is adjustable by a needle valve that is also adapted to be adjusted by a reversible electric motor that can be actuated simultaneously with the motor for varying the volume of the air chamber.

Various other obvious features and attendant advantages of the present invention will be more fully appreciated as the same becomes better understood from the following detailed description when considered in connection with the accompanying drawing which is a sectional view of an air cushion constructed in accordance with the present invention.

DESCRIPTION OF THE PREFERRED EMBODIMENT

With reference to the drawing, there is shown an air spring assembly 10 having a first base 11 and a second base 12. The first base 11 comprises a base plate 13 adapted to be secured such as by bolts 14 to the vehicle body (not shown) and having a depending circular wall 15 terminating in a free edge 16. Centrally of the base plate 13 of the first base 11 there is a depending rod 17 secured at its upper end to the base plate 13 by a nut 18 threaded on a reduced end portion 19 of the rod 17 that extends through a bushing 20 formed in the base plate 13.

The second base 12 comprises a base plate 21 having a depending lug 22 in which is journalled a pin 23 adapted to be secured to the running gear (not shown) of a vehicle. The second base 12 includes a shock absorber 24 having a shock absorber cylinder 25 upstanding from the base plate 21 and comprising a sidewall 26 closed at the top by a top plate 27 through which the rod 17 slidably extends to permit guided movement of the top plate 27 endwise of the rod 17 and thus provides for movement of the shock absorber 24 relative to the base plate 13 of the first base 11. Within the shock absorber cylinder 25, the rod 17 has secured thereto a damper piston 28 that divides the shock absorber cylinder 25 into an upper fluid compartment 29 and a lower fluid compartment 30. Formed within the sidewall 26 of the shock absorber cylinder 25 is a fluid cylinder 31.

The lower fluid compartment 30 is connected to the upper fluid compartment 29 through the damper piston 28 by an orifice 32 and a one-way valve 33. The upper fluid compartment 29 is connected to a lower fluid compartment through the piston 28 by an orifice 34 and a one-way valve 35. The upper and lower fluid compartments are also interconnected through a bore 36 into the base plate 21 of the second base 12 that intersects an orifice 37 that includes a horizontal leg 38 in the base plate 21 that extends to the sidewall 26, a vertical leg 39 in the sidewall 26 to the upper portion thereof and a horizontal duct 40 from the leg 39 through the inner portion of the sidewall 26 of the shock absorber cylinder 25 above the upper end of the reservoir 31.

A needle valve 41 is threaded through a bore 42 which in effect comprises an extension of the horizontal leg 38 of the orifice 37 and is adapted to meter fluid through bore 36 into the horizontal leg 38 of the orifice 37. Needle valve 41 is adapted to be rotated by a reversible electric motor 43 that, upon rotation in opposite directions, with either move the needle valve to the left into the mouth of the horizontal leg 38 of the orifice 37 to reduce to opening into the orifice 37 and thus to reduce the fluid flow from the bore 36 into the leg 38, or to the right to increase the opening between the duct 36 and the leg 38 and thus increase the fluid flow.

One end of a cylindrical flexible connector or skirt, which is herein called a bellows 44, surrounds the periphery of the sidewall 26 of the shock absorbing cylinder 25 adjacent to the top thereof and secured thereto by a strap 45 to provide an air-tight seal. The bellows 44 extends generally downwardly about the periphery of the sidewall 26 and is folded upwardly on itself with the other end thereof surrounding the bottom portion of the depending wall 15 of the first base 11 about the free edge 16 and is secured thereto by a strap 46 to provide an air-tight seal.

Accordingly, as the shock absorber 24 moves upwardly and downwardly along rod 17 the bellows 44 follows to maintain a seal between the walls 26 and 15. There is thus provided a closed air chamber 47 that provides an air cushion into which air is adapted to be introduced—as by a suitable fitting (not shown). The volume of the air chamber 47 is reduced (and the pressure therein is correspondingly increased) as the top wall 27 of the shock absorber 24 moves vertically upwardly towards the top plate 13 of the first base 11 to provide a cushion and is increased as the top wall 27 moves downwardly away from the top plate 13, the bellows 44 maintaining the air chamber closed. A bumper 48 is provided about the rod 17 at the bottom of the bushing 20 to absorb the impact between the top wall 27 and the bushing 20 in the event of a particularly violent force imposed on the shock absorber 24 that drives it to the end of its stroke on the rod 17.

To adjust the volume of the air chamber 47 and thus to adjust the spring constant, there is provided a piston chamber 49 extending laterally from the sidewall 15 of the first base 11 and having opening 50 communicating with the air chamber 49. A piston 51 is mounted in the piston chamber 49 for sliding axially thereof and serving to divide piston chamber 49 into an open compartment 52 that communicates through the opening 50 with the air chamber 47 and a closed compartment 53.

A reversible electric motor 54 is secured to the free end of the piston chamber 49 and has a shaft 55 that extends through the piston 51 and is journalled in bearings 56 in the sidewall 15 of the first base 11 and bearings 57 in the endwall 58 of the piston chamber 49. The shaft 55 is provided with a screw thread that, as shown, is connected to the piston 51 by a ball connection whereby, upon rotation of the shaft 55 in opposite directions, the piston 51 is moved to increase or to decrease the volume of the open compartment 52. As the volume of the open compartment 52 is increased or decreased, the volume of the air chamber 47 is correspondingly increased or decreased, which changes the spring constant of the air cushion 37 and thus provides a softer or stiffer spring action. An orifice 59 is provided in the piston 51 to permit air to flow between the open compartment 52 and the closed compartment 53 as the piston is adjusted.

The electric motors 43 and 54 can be operated to simultaneously adjust both the volume of the air chamber 47 and the stiffness of the shock absorber 24.

Obviously, numerous modifications and variations of the present invention are possible in light of the above teachings. It is therefore to be understood that, within the scope of the appended claims, the invention may be practiced otherwise than as specifically described herein.

We claim:

1. An air spring assembly comprising:
a first base and a second base, said second base including a base plate and a shock absorber cylinder extending from said base plate;
a rod connected at one end to said first base and extending into said shock absorber cylinder, said second base movable along said rod toward and away from said first base;
a damper piston fixed on said rod within said shock absorber cylinder;
means interconnecting said first and second bases and providing a main air chamber therebetween, the volume of said main air chamber changeable in accordance with the movement of said second base toward and away from said first base;
an auxiliary air chamber positioned adjacent to said main air chamber, said auxiliary air chamber having an opening to said main air chamber, said opening being of substantially the same diameter as said auxiliary air chamber so as to provide substantially unrestricted passage of air between said auxiliary air chamber and said main air chamber, said auxiliary air chamber having a piston slidably mounted for axial movement therein to vary the volume of said auxiliary air chamber open to said main air chamber to thereby vary the volume of said main air chamber;
and movement means connected to said piston of said auxiliary air chamber for moving said piston of said auxiliary air chamber.

2. The assembly recited in claim 1, said movement means adapted to allow said piston of said auxiliary air chamber to be moved between an infinite number of positions within said auxiliary air chamber.

3. The assembly recited in claim 1, said movement means comprising a reversible electric motor.

4. The assembly recited in claim 3 further including a shaft linked to said reversible electric motor and rotatable upon actuation of said reversible electric motor, said shaft extending within said auxiliary air chamber and through said piston of said auxiliary air chamber, said piston of said auxiliary air chamber and said shaft being linked through a threaded connection such that said piston of said auxiliary air chamber moves along said shaft when said shaft rotates.

5. The assembly recited in claim 1, said means interconnecting said first and second bases comprising a bellows.

6. The assembly recited in claim 1, said damper piston dividing said shock absorber cylinder into two chambers on either side thereof, said second base further including an orifice linking the chambers on either side of said damper piston.

7. The assembly recited in claim 6 further comprising a needle valve extending into said orifice to control the link via said orifice between said chambers on either side of said damper piston, the position of said needle valve in said orifice controlled by an electric motor.

* * * * *